(12) United States Patent
Anderson et al.

(10) Patent No.: US 8,431,028 B2
(45) Date of Patent: Apr. 30, 2013

(54) METHOD AND SYSTEM FOR AUTOMATED WATER DRAINAGE IN FUEL SYSTEM

(75) Inventors: Larry Gene Anderson, Erie, PA (US); Sandeep Banga, Erie, PA (US); Sivanaga Venu Varma Dantuluri, Hyderabad (IN); Shawn Michael Gallagher, Erie, PA (US); Jaslok Kaur, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/499,696

(22) PCT Filed: Oct. 1, 2010

(86) PCT No.: PCT/US2010/051094
§ 371 (c)(1),
(2), (4) Date: Mar. 31, 2012

(87) PCT Pub. No.: WO2011/041659
PCT Pub. Date: Apr. 7, 2011

(65) Prior Publication Data
US 2012/0193300 A1    Aug. 2, 2012

Related U.S. Application Data

(60) Provisional application No. 61/248,128, filed on Oct. 2, 2009.

(51) Int. Cl.
*B01D 17/02*    (2006.01)
(52) U.S. Cl.
USPC ........... 210/799; 210/112; 210/114; 210/248; 210/299

(58) Field of Classification Search ................... 210/112, 210/114, 248, 299, 799
See application file for complete search history.

(56) References Cited

U.S. PATENT DOCUMENTS 6,371,087 B1    4/2002    Condran et al.
2011/0088800 A1*    4/2011    Core ............................ 137/613

FOREIGN PATENT DOCUMENTS

DE    102007039661 A1    3/2008
WO    93/18474 A1    2/1993
WO    2008/023029 A2    2/2008

OTHER PUBLICATIONS

Search Report from corresponding PCT Application PCT/US10/51094, Date as Jan. 14, 2011.

*Primary Examiner* — Duane Smith
*Assistant Examiner* — Paul J Durand
(74) *Attorney, Agent, or Firm* — GE Global Patent Operation; John A. Kramer (57) ABSTRACT

A system for automated water drainage in a fuel system includes a fuel-water separator, a water sensor, first and second drain valves, a drain pressure sensor, and a control system, which is operably connected to the first and second drain valves, the water sensor, and the drain pressure sensor. The water sensor is disposed in the fuel-water separator for detecting the presence of water. The first drain valve is in fluid communication with the fuel-water separator, and the second drain valve is in fluid communication with the first drain valve; a fluid duct connects the first and second drain valves. The drain pressure sensor is positioned in the fluid duct, for detecting pressure levels in the fluid duct. The control system automatically operates the first and second drain valves, for removing purge liquid from the fuel-water separator, based on signal outputs of the water sensor and the drain pressure sensor.

13 Claims, 6 Drawing Sheets

METHOD AND SYSTEM FOR AUTOMATED WATER DRAINAGE IN FUEL SYSTEM

CROSS-REFERENCE TO RELATED APPLICATIONS

This application is a national stage entry of PCT/US2010/051094 filed 01 Oct. 2010, which claims priority from provisional application 61/248128 filed 02 Oct. 2009.

FIELD OF THE INVENTION

Embodiments of the invention relate to engine systems. Other embodiments relate to fuel systems for an engine.

BACKGROUND OF THE INVENTION

Water may become intermixed with diesel fuel or other fuels in several ways, including purposeful mixing, condensation of humid air, during transportation from refineries or other stations to end-distribution holding tanks, by leakage through faulty valves, pipes, or vents, and by careless handling. Water can cause injector nozzle and pump corrosion, microorganism growth, and fuel filter plugging with materials resulting from corrosion or microbial growth. In cold climates, ice formation in fuels containing water may cause fuel line and filter plugging problems. Regularly removing any water from the fuel being used is the most effective means of preventing these problems.

Fuel-water admixtures may even be more problematic in a locomotive context. In particular, locomotive engines consume much more fuel than other mobile applications, so there is a potential to accumulate a lot of water. However, for cost and other practical purposes, locomotives generally have only two scheduled maintenances a year. Because of this, locomotives may require large dedicated water holding tanks. Additionally, manually operated purge valves, such as found on some on-highway vehicles, are not practical; that is, a manual water drain strategy does not work well on a locomotive application since railroad practices typically only allow manual intervention every 180 days. Further, locomotive engines run mostly unmanned (operator cannot see the engine), so failures in an automatic drain system that could cause fuel spills must be avoided.

BRIEF DESCRIPTION OF THE INVENTION

Embodiments of the present invention relate to a system for automated water drainage in a fuel system. The drainage system includes a fuel-water separator, a water sensor, first and second drain valves, a drain pressure sensor, and a control system. The water sensor is operably disposed in the fuel-water separator for detecting the presence of water. The first drain valve is in fluid communication with the fuel-water separator, and the second drain valve is in fluid communication with the first drain valve; a fluid duct connects the first and second drain valves. The drain pressure sensor is in fluid communication with the fluid duct, for detecting pressure levels in the fluid duct. The control system is operably connected to the first and second drain valves, the water sensor, and the drain pressure sensor. The control system automatically operates the first and second drain valves, for removing water or other purge liquid from the fuel-water separator, based on respective signal outputs of the water sensor and the drain pressure sensor. ("Purge liquid" refers to a liquid removed from a fuel-water separator, which may comprise fuel, water, or a water-fuel emulsion.)

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
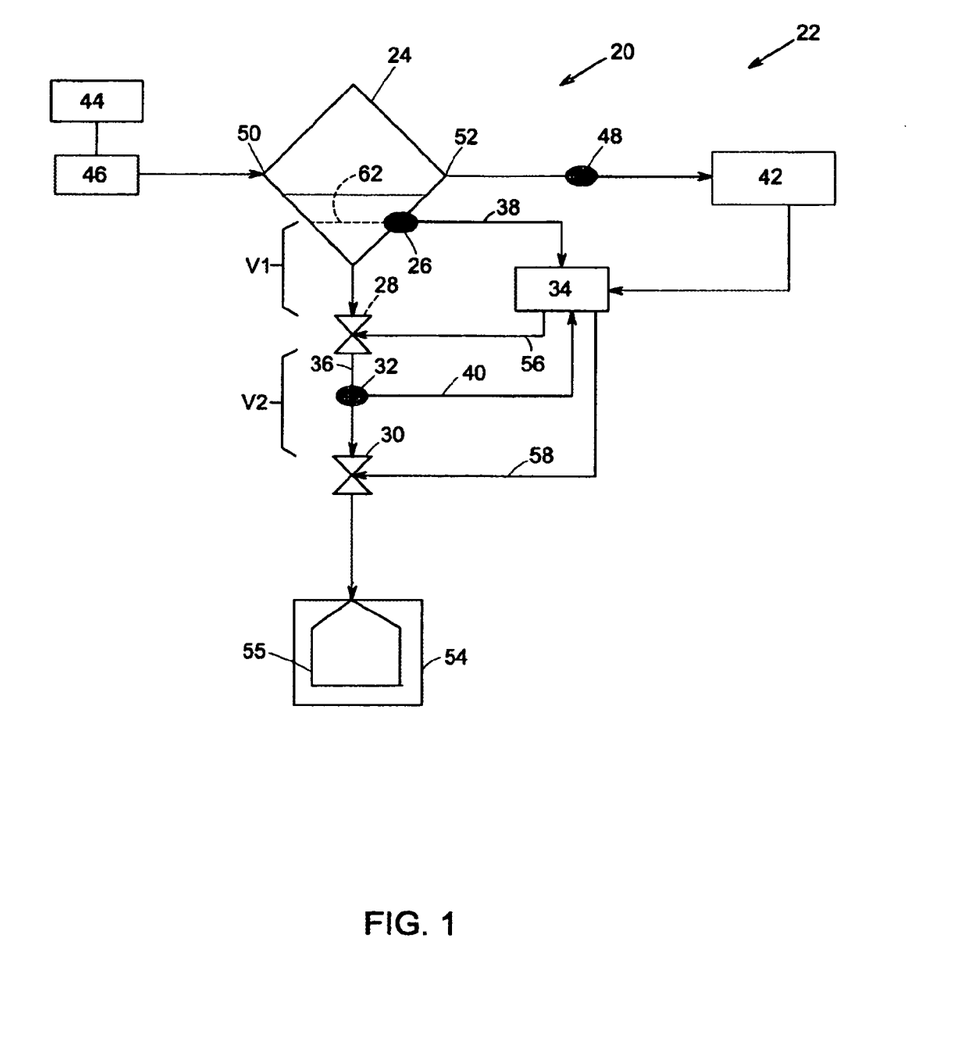
FIG. 1 is a schematic diagram of an automated water drainage system for a fuel system, according to an embodiment of the present invention.

With reference to FIG. 1, an embodiment of the present invention relates to an automated water drainage system 20 for a fuel system 22. In overview, the drainage system 20 includes a fuel-water separator 24, a water sensor 26 (e.g., water in fuel protection sensor—WIFP), a first drain valve 28 (e.g., water in fuel top valve—WFTV), a second drain valve 30 (e.g., water in fuel bottom valve—WFBV), a drain pressure sensor 32 (e.g., water in fuel drain pressure sensor—WFDP), and an engine control unit (ECU) or other control system 34. The water sensor 26 is operably disposed in the fuel-water separator 24 for detecting the presence of water. The first drain valve 28 is in fluid communication with the fuel-water separator 24, and the second drain valve 30 is in fluid communication with the first drain valve 28; a fluid duct 36 connects the first and second drain valves 28, 30. The drain pressure sensor 32 is in fluid communication with the fluid duct 36, for detecting pressure levels in the fluid duct. The control system 34 is operably connected to the first and second drain valves 28, 30, the water sensor 26, and the drain pressure sensor 32. As discussed in more detail below, the control system 34 automatically operates the first and second drain valves 28, 30 for removing water or other purge liquid from the fuel-water separator 24, based on respective signal outputs 38, 40 of the water sensor 26 and the drain pressure sensor 32. ("Purge liquid" refers to a liquid removed from a fuel-water separator, which may comprise fuel, water, or a water-fuel emulsion.)

The fuel system 22 provides fuel to an engine system 42 in a vehicle or other powered system. The fuel system includes a fuel storage tank(s) 44, a fuel transfer pump (FTP) 46 for pumping fuel to the engine, and, in some fuel systems, an engine fuel pressure sensor (EFP) 48. (In some embodiments, the engine fuel pressure sensor 48 is provided as part of the drainage system 20.) The fuel-water separator 24 is positioned between the fuel transfer pump 46 and the engine system 42. The fuel-water separator 24 receives fuel as pumped by the pump 46 from the fuel storage tank(s) 44, and provides fuel to the engine system 42. Thus, the fuel-water separator 24 includes a fuel inlet 50, through which fuel (e.g., wet fuel) from the pump 46 enters the fuel-water separator 24, and a fuel outlet 52, through which fuel exits the fuel-water separator 24 for the engine system 42. (One or more primary fuel filters, not shown, may be disposed in the fuel line between the pump 46 and fuel-water separate 24, for filtering fuel.) The purpose of the fuel-water separator 24 is to separate water from fuel, such that although "wet fuel" (mixture of fuel and water) may enter the fuel-water separator 24, "dry fuel" exits the fuel-water separator 24 and is provided to the engine system. ("Dry fuel" is fuel with no mixed-in water, or at least fuel with a lower amount of mixed-in water than the wet fuel entering the fuel-water separator 24.)

The engine system 42 may include a diesel internal combustion engine, and the fuel may be diesel fuel oil (commonly known as diesel or diesel fuel). Alternatively, the engine system may include another type of internal combustion engine or other engine. Instead of diesel, the fuel may be bio-diesel or another bio-fuel oil, kerosene, other fuel oils, or other petroleum distillates of similar density. The vehicle may be a locomotive or other off-highway vehicle.

As noted above, the drainage system 20 includes the fuel-water separator 24, the water sensor 26, the first drain valve 28, the second drain valve 30, the drain pressure sensor 32, and the engine control unit or other control system 34. The drainage system 20 may further comprise a holding tank 54 in fluid communication with the second drain valve 30 for receiving purge liquid drained from the fluid duct 36. The holding tank 54 may be connected to the second drain valve 30 via a purge drain 55. The fuel-water separator 24 is a vessel, having an interior volume, which is capable of holding liquids (e.g., fuel and/or water) in a generally leak proof or watertight manner (meaning no leakage or only de minimus leakage/seepage, below safety or other designated standards). The water sensor 26 is positioned in the interior of the fuel-water separator 24 or in fluid communication with the fuel therein. Although referred to as a "water" sensor, the sensor 26 is more specifically a water-in-fuel sensor, that is, a sensor configured and able to detect water in the presence of fuel. The water sensor 26 is electrically connected to the control system 34, and outputs a signal 38 to the control system 34 indicative of whether water is present at the sensor tip or other active sensor portion of the sensor 26 where water is detected. The water sensor 26 is considered as being dry if no water is detected at a sensing tip or portion thereof; exposure to air or fuel (without water present) would be considered dry conditions.

The control system 34 may comprise an electronic unit configured to receive output signals 38, 40 from sensors 26, 32 (and/or other signals from other sensors), and to generate control signals 56, 58 for controlling (e.g., opening or closing) the valves 28, 30, respectively. The electronic unit may comprise an engine control unit, which may be an existing part of the engine system 42. Alternatively, the electronic unit may be a dedicated processor- or microcontroller-based device, a computer or computer system, a dedicated electronic circuit (analog and/or digital), or the like. The control system 34 may include software or other programming instructions, implemented in conjunction with the engine control unit or other electronic unit, for controlling the engine control unit or other electronic unit in one or more of the manners specified here. Typically, the engine control unit or other electronic unit will perform one or more functions upon executing software or other programming instructions.

Figure 2:
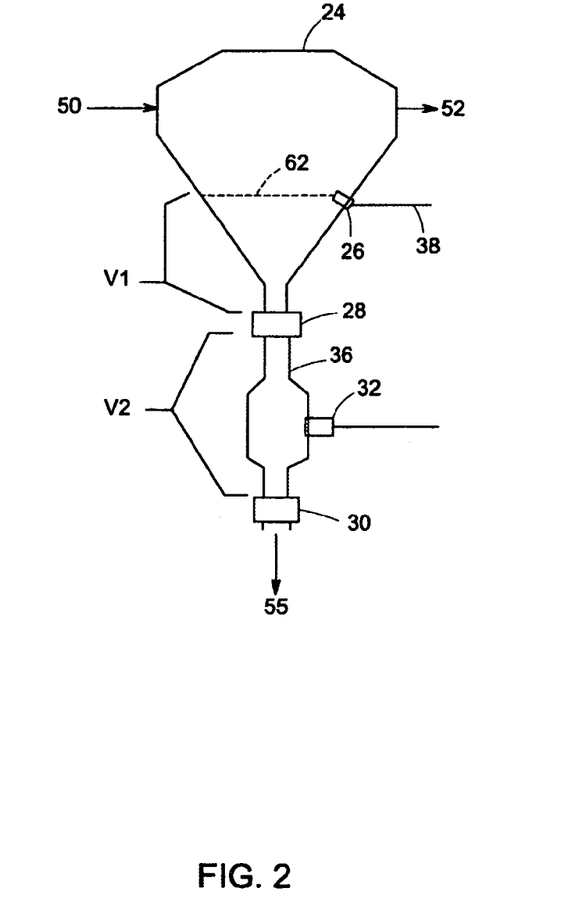
FIG. 2 is a detail schematic view of a portion of the automated water drainage system for a fuel system, according to another embodiment of the present invention.

Referring to FIG. 2, in one embodiment, the first drain valve 28 is located at a bottom of the fuel-water separator 24, below a position of the water sensor 26, and the second drain valve 30 is located below the first drain valve 28. In some embodiments, therefore, the first drain valve may be referred to as a top drain valve, and the second drain valve as a bottom drain valve. If a holding tank 54 is provided, it may be located below the second drain valve 30. Here, therefore, the fuel-water separator, first drain valve, second drain valve, and holding tank (if present) form a generally vertically-oriented array, for gravity and/or system pressure-based separation of water from fuel in the fuel-water separator and gravity and/or system pressure-based transmission of purge liquid from the fuel-water separator 24, through the valves 28, 30, and into the holding tank 54 or other egress. As should be appreciated, in this embodiment no additional pump is required, since purge liquid is purged from the low-pressure system 20 using the existing fuel supply pressure (of the fuel system 22) and gravity.

In another embodiment, and with additional reference to FIG. 2, a first volume V1 is defined by the fuel-water separator between the first drain valve 28 and a lateral plane 62 coincident with the position of the water sensor 26. "Lateral" plane 62 is a plane cutting horizontally across the fuel-water separator, at the level of the water sensor, when the fuel-water separator is positioned in its designated orientation for normal use. The first volume V1, therefore, is defined by the interior shape of the fuel-water separator 24 below the plane 62, by the first drain valve 28 when closed, and by any interconnecting volume between the first drain valve 28 (when closed) and the fuel-water separator 24 interior. A second volume V2 is defined by the fluid duct 36 between the first drain valve 28 (e.g., when closed) and the second drain valve 30 (e.g., when closed). The first volume V1 is less than or equal to the second volume V2, namely, (V1≦V2), so that when the first drain valve 28 is opened with the second drain valve closed 30, the second volume V2 accommodates at least as much purge liquid as occupying the first volume V1 in the fuel-water separator 24. Typically, V1 and V2 should be approximately the same. If it is more important to only drain water with no fuel mixed, then V1 should be slightly greater than V2. This will leave a small amount of water in V1 to start the next cycle. Alternatively, if it is important to drain all water from V1, and it is acceptable to purge some fuel with the water, then V1 should be slightly less volume than V2.

As indicated above, the system 20 automatically removes water from the fuel system 22. For doing so, in one embodiment, and with further reference to FIG. 3, the control system 34 opens the first drain valve 28 based on an output signal 38 of the water sensor 26 indicating the presence of water in the fuel-water separator 24; the second drain valve 30 is closed. (See step 100). At step 102, the control system 34 verifies that the first drain valve 28 is open, that the second drain valve 30 is closed, and that the system 20 is pressurized within designated levels based on a pressure detected by the drain pressure sensor 32 after the first drain valve is opened. At step 104, the control system 34 waits for a designated time period for the separated purge liquid to drain from V1 to the fluid duct 36 between the first and second drain valves 28, 30. At step 106, the control system 34 closes the first drain valve 28 and thereafter opens the second drain valve 30 for allowing the purge liquid to drain from the fluid duct 36 into the purge drain 55.

Figure 3:
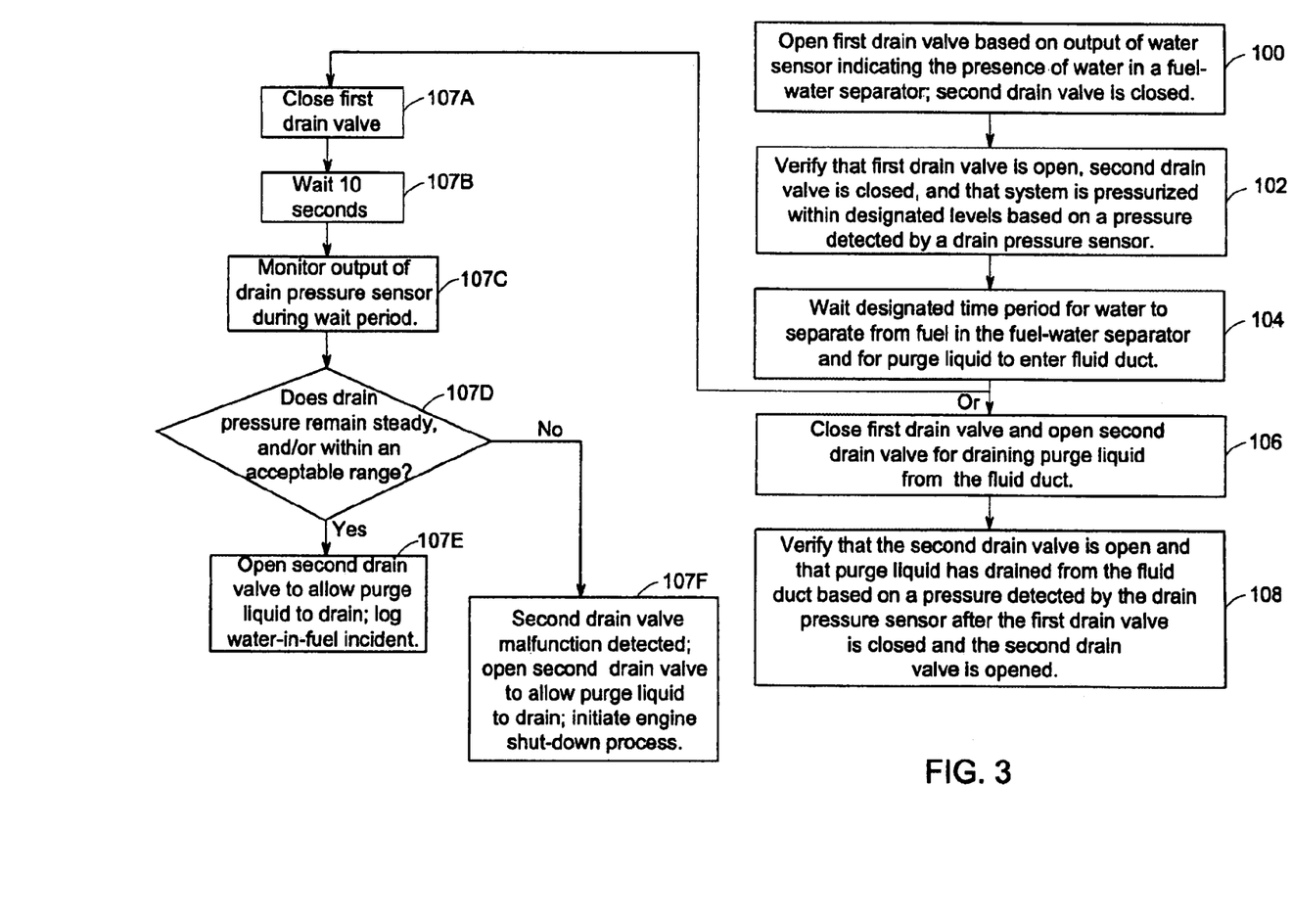
FIG. 3 is a flow chart illustrating a method for automatically removing water from a fuel system, according to an embodiment of the present invention.

In one embodiment, at step 108, the control system 34 verifies that the second drain valve 30 is open and that the purge liquid has drained from the fluid duct 36, based on a pressure detected by the drain pressure sensor 32 after the first drain valve is closed and the second drain valve is opened.

Still referring to FIG. 3, in another embodiment of the water drainage system 20, the steps 107A through 107F are included following step 104 for checking the functionality of the second or bottom drain valve 30. Once the wait period of step 104 is lapsed to allow the fluid duct 36 to fill with the purge liquid, the first or top drain valve is closed as shown at step 107A. At step 107B, the control system 34 activates another timer for a designated time period (e.g., 10 seconds)

and the pressure of the purge fluid contained within the fluid duct 36 is monitored via the drain pressure sensor 32 for a portion of the designated time. (Step 107C). At decision block 107D, if the output of the drain pressure sensor 32 indicates a steady pressure during the measuring period, or within an acceptable range of pressures, the process continues at step 107E wherein the second drain valve 30 is opened thereby allowing the purge fluid to drain from the fluid duct 36 into the purge drain 55. Otherwise, if the pressure within the fluid duct 36 decays over time, the second drain valve 30 may be faulty or leaking. If the control system 34 detects a leak or malfunction with the second drain valve 30, the control system will initiate a shut down process for the engine 42. (See step 107F).

The automated water drainage system 20 controls removal of free water that has been separated from diesel fuel or other fuel. The system has a high degree of reliability, self-diagnostics, and safety, as required to meet the demands of severe operational environments and government environmental standards. In certain embodiments, the system uses feedback sensors, system configuration parameters, engine operational data, logistical data, and control algorithms to diagnose the automatic drain system, engine health, and fuel quality.

Figure 4:
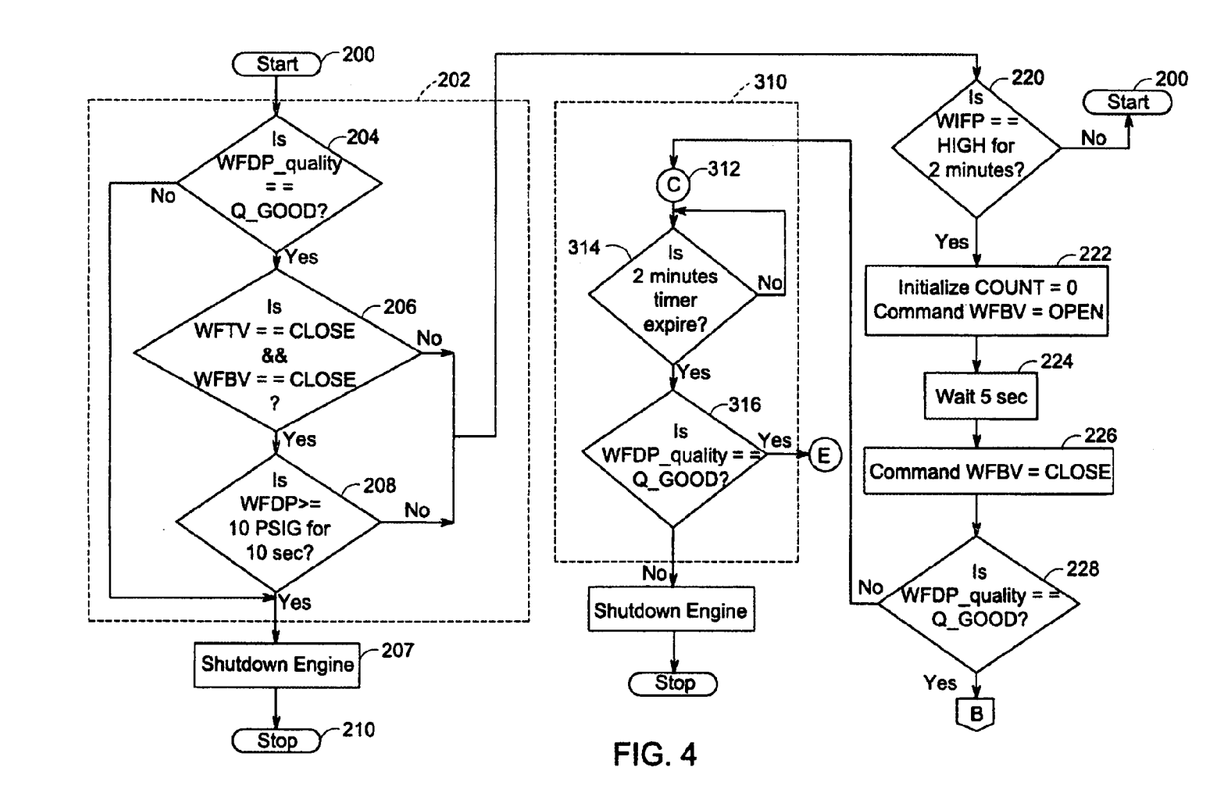
FIGS. 4-6 show a flow chart illustrating an embodiment of a method for automatically removing water from a fuel system.
Figure 5:
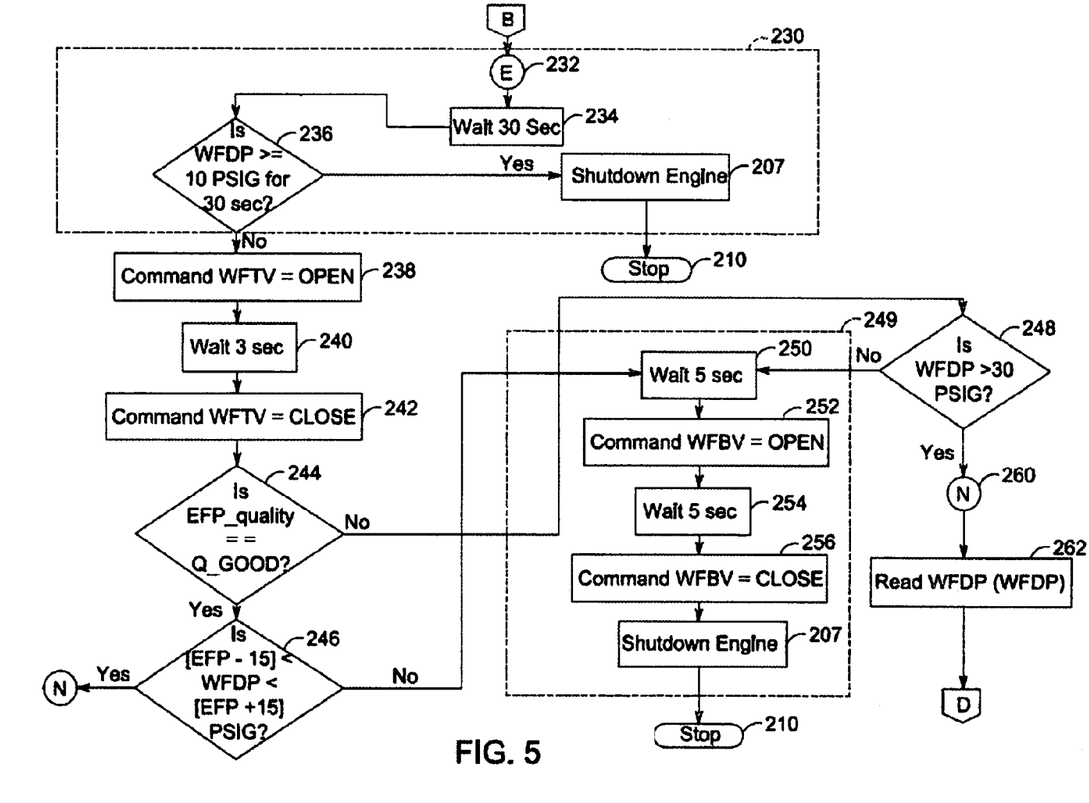
Figure 6:
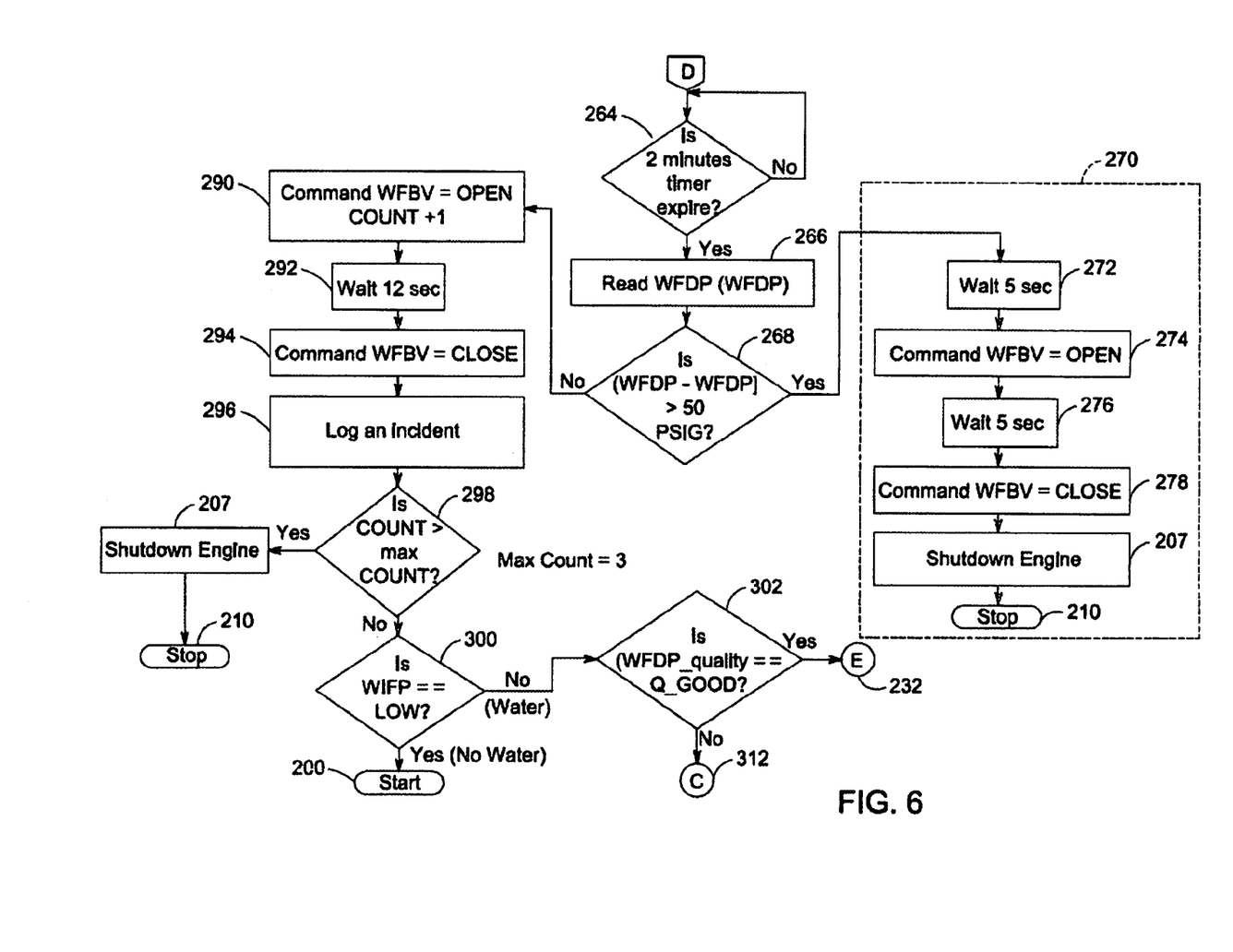

FIGS. 4-6 show a flow chart or flow diagram of the automated water drainage system 20 in operation, and an associated method for automatically removing water from a fuel system, according to various embodiments of the present invention. All control functions (e.g., sensor interrogation and valve actuation) are performed by the control system 34; no operator intervention is required for automatic system operation. In an embodiment, the method(s) of FIGS. 4-6 are only enacted when the engine is running.

Referring to FIG. 4, the operation of the water drainage system starts at block 200 and is typically enabled when the engine 42 is running. As noted in process block 202, the control system 34 provides continuous monitoring/review of the status of the first (top) drain valve 28 for detecting a malfunctioning or leaky valve. Although set forth as continuous in the illustrated embodiment, in other embodiments, the monitoring/review of the status of the first drain valve 28 can be performed at start-up, on a periodic basis, or at other times, typically when the water sensor 26 is dry.

In the illustrated example, at decision block 204, the control system 34 checks the output of drain pressure sensor 32 to determine whether or not the drain pressure sensor 32 is functioning properly and/or the quality of the output thereof. Various known methods may be used to determine whether or not the pressure sensor 32 or other sensors in the system 22 are functioning properly. In one embodiment, the pressure sensor 32 is determined to be functioning properly if the output is within a certain operating range. Otherwise, if the output of the pressure sensor 32 is outside of the operating range, the pressure sensor 32 may be deemed faulty or not working. Continuing at decision block 204, if the quality of the output of the pressure sensor 32 is negative, "No Good," this indicates that the pressure sensor 32 may not be operating properly. If the pressure sensor 32 is determined to be not operating properly, the process jumps to block 207 wherein the control system 34 initiates a shutdown engine process and logs an incident report. Thereafter, if the shutdown engine process is initiated, the control system 34 stops the process of the automated water drainage system 22 as indicated at Stop block 210. Following a diagnostic procedure including wherein the pressure sensor 32 is repaired or replaced, the engine 42, fuel system 22 and automated water drainage systems are restarted.

At block 204, if the quality of the output of the pressure sensor 32 is determined to be "OK" or "Good," the process continues at block 206 wherein the control system 34 checks the status of both of the top and bottom drain valves 28, 30. In some embodiments of the automated water drainage system 22, a default position for both of the top and bottom drain valves 28, 30 is closed. If both of the top and bottom drain valves 28, 20 are closed, the pressure level in the fluid duct 36 is checked, at step 208. At step 208, if the pressure level in the fluid duct 36 is more than a designated level for a designated time period, e.g., if the pressure in the fluid duct is greater than 10 psi for a period of 30 seconds, this indicates that the first drain valve is not closed or otherwise not functioning properly. Thus, if the control system 34 detects a relatively high level of pressure in the fluid duct 36, as from the fuel-water separator 24, into the fluid duct, despite the top and bottom drain valves 28, 30 having been controlled into a closed state, then it is determined that the top drain valve 28 may leak or has otherwise malfunctioned. Accordingly, if the pressure at the drain pressure senor 32 is identified as greater than the designated threshold pressure over the designated time period, the process continues at block 207 wherein the control system 34 initiates a shutdown engine process and logs an incident report due to the determination of a possible malfunctioning top drain valve 28. Thereafter, if the shutdown engine process is initiated, the control system 34 stops the process of the automated water drainage system 22 as indicated at "Stop" block 210. The first drain valve may be serviced and/or replaced.

Continuing at step 206, if one or both of the top and bottom drain valves 28, 30 are determined to be not in a closed position, the operational process of system 22 continues at decision block 220 discussed following. Likewise, at step 208, if the pressure at the drain pressure sensor is less than the designated threshold. pressure for the designated time period, there is no determination that the top drain valve is malfunctioning and the process continues at decision block 220.

At step 220, the control system 34 checks the pressure at the water sensor 26. Water is deemed present at the water sensor 26 if the pressure is identified as high (e.g., above a designated threshold for a designated period of time such as 2 minutes). If the output 38 of the water sensor is low (e.g., below a threshold pressure, or high for less then a designated time threshold), then a no water or dry fuel condition is identified and the water drainage process 20 returns to the start block 200.

When the output 38 is indicative of water being sensed by the water sensor 26, the second (bottom) drain valve 30 is opened, as at step 222 via the control, system 34. Also at step 222, the control system 34 initializes a counter to zero. In some embodiments, the counter can be used to monitor the number and/or frequency of an occurrence of a water in fuel determination. Continuing at step 224, a timer is set for a designated period of time (5 seconds in the FIG. 4 embodiment) to make ensure the fluid duct 36 is drained of any remaining purge liquid or fuel. Thereafter, at step 226, the control system 34 activates the bottom drain valve 30 to move to a closed position. At block 228, the quality of the output of the pressure sensor 32 is checked. If the output of the pressure sensor 32 is determined to be outside of a designated operational range or otherwise of unacceptable quality, the control system 34 will continue at process block 310, identified by the letter "C" at block 312 of FIG. 4. The process block 310 is directed to checking the operation of the drain pressure sensor 32 as set forth further following.

If the pressure sensor 32 is deemed to be functioning properly at step 228, the process 20 continues at process block 230

(also identified by the letter block "E" and reference number 232). At this point the flow chart is continued on FIG. 5 where FIGS. 4 and 5 are joined by aligning the continuation blocks "B" shown on each of these Figures. Continuing at step 234, the control system 34 activates a timer to wait a designated period of time (e.g., 30 seconds) to confirm in part the proper functionality of both of the top and bottom drain valves 28 and 30, respectively. At block 236 the output of the drain pressure sensor 32 is monitored over a period of time thereby checking the pressure in the fluid duct 36. If the pressure in the fluid duct 36 is above a designated threshold for a designated time period a determination is made that one or both of the top and bottom drain valves 28, 30 is malfunctioning and the process continues at block 207. The finding of an elevated pressure in the fluid duct 36 could indicate that the top drain valve-28 is leaking and allowing fuel and/or purge liquid to drain from the fuel/water separator 24 into the fluid duct 36. Alternatively, the occurrence of elevated or increasing pressure in the fluid duct 36 could indicate that the bottom drain valve 30 may be stuck closed and/or not operating properly. As shown in block 236, in the illustrated embodiment, a determination of a malfunctioning top or bottom drain valve is made upon the pressure at the pressure sensor 32 being greater than or equal to 10 psig for a duration of thirty seconds. At block 207, the control system 34 initiates a shutdown engine process and logs an incident report due to the determination of a possible malfunctioning top or bottom drain valve 28, 30. Thereafter, if the shutdown engine process is initiated, the control system 34 stops the process of the automated water drainage system 22 as indicated at Stop block 210. The first and second drain valves may be checked, serviced and/or replaced.

At block 236, if the output of the drain pressure sensor 32 is determined to be normal, or below the threshold identifying a malfunctioning drain valve, the process continues to step 238 wherein the control system 34 issues an instruction for opening the top drain valve 28. A state of the water sensor 26 should change from wet (water sensed) to dry (no water sensed) at this time, which may be indicated by a pressure drop in the output 38. (This is because the volume V1 of the fuel-water separator 24 from the water sensor 26 to the first drain valve 28 is typically less than or equal to the volume V2 of the system from the first drain valve 28 to the second drain valve 30.) The separation of water from fuel does not occur at a high rate, so some dwell period of time (a first designated time period) will be allowed, with the first drain valve 28 open, for drainage of the purge liquid into the fluid duct 36. The control system 34 may set a timer, as at step 240, for this purpose; the timer is set to the first designated time period for separation drainage (e.g., the timer may be set to 3 seconds as in block 240 of FIG. 5). After the designated time period has expired, the first drain valve 28 is closed, at step 242.

At block 244, the control system 34 checks the output of the engine fuel pressure sensor 48 to ensure the sensor 48 is providing an acceptable quality output and/or within a designated operational range. If the engine fuel pressure sensor 48 is determined to be functioning properly, the engine fuel pressure is compared to the pressure in the fuel duct 36 via the drain pressure sensor 32 at block 246. If the pressure level in the fluid duct 36 is similar to the monitored engine fuel pressure (e.g., within 15 psig of one another) the process jumps to block 260 identified as letter block "N". Thereafter at step 262, the control system 34 checks the output of the drain pressure sensor 32 and stores the data representing the pressure in the fluid duct 36. At this point, the process flowchart is continued on FIG. 6 at block 264 as discussed further hereinbelow. FIGS. 5 and 6 are joined by aligning the continuation blocks "D" included on each of these Figures.

Referring again to FIG. 5, at block 244, if the output of engine fuel pressure sensor 48 fails a quality check, or if the sensor 48 output is outside of a designated operational range, the control system 34 checks the pressure within the fluid duct 36 as shown at block 248. At block 248, if the fluid duct pressure is greater than a designated threshold (e.g., 30 psig) the fuel drainage process continues at block 260 and 262 wherein the control system 34 checks the output of the drain pressure sensor 32 and stores the pressure in the fluid duct 36 (e.g., as WFDP). At this point, the process flowchart is continued at block 264 of FIG. 6 as discussed further hereinbelow.

Returning to block 248, if the pressure in the fluid duct 36 is determined to be less than a designated threshold pressure (e.g., 30 psig.), the control system 34 proceeds to an engine shut down process at process block 249 based on a determination that the top drain valve 28 may not have closed properly or is otherwise malfunctioning. The shut down process continues at step 250 wherein the control system 34 activates a timer to allow a designated wait period to lapse (e.g., 5 seconds). At block 252, the control system 34 commands the bottom drain valve 30 to be opened to allow the fluid duct 36 to drain. The process continues, at step 254 wherein the control system activates a timer for providing a wait period to allow the fluid duct 36 to drain. As shown in block 254, in the FIG. 5 embodiment, the wait timer is set at 5 seconds. Following the wait time, at block 256, the control system 34 issues a command to close the bottom drain valve 30. The process continues at block 207 wherein the control system 34 initiates a shutdown engine process and logs an incident report due to the determination of a possible malfunctioning top drain valve 28. After the shutdown engine process is initiated, the control system 34 stops the process of the automated water drainage system 22 as indicated at Stop block 210.

Similarly, at block 246, after the purge liquid is allowed to drain from the fuel-water separator 24 to the fuel duct 36, if the engine fuel pressure and the pressure within the fuel duct are compared and not within a designated maximum difference (e.g., 15 psig), then the control system 34 makes a determination that the top drain valve 28 may be malfunctioning and initiates an engine shut down process shown at process block 249. As discussed hereinabove, the engine shut down process continues at block 250.

Referring now to FIG. 6, the purge liquid drain process continues at block 264, following the checking and recording of the pressure within the fluid duct 36 as shown at step 262 of FIG. 5. At block 264, the control system 34 activates a timer (e.g., two minute timer) to allow the pressure within the fluid duct 36 to stabilize following the filling thereof with the purge liquid. Following the pressure stabilization wait period, the control system 34 again checks the pressure within the fluid duct 36 via the drain pressure sensor 32 as shown at step 266 and records the same as WFDP'. At block 268, the pre and post pressure stabilization wait period fluid duct pressures, namely, WFDP and WFDP' are compared. If the difference between WFDP and WFDP' is greater than a predetermined value (e.g., 50 psig), the control system 34 moves to an engine shut down process 270 based on a determination of a possible leaky or malfunctioning bottom drain valve 30.

The engine shut down process continues at step 272 wherein the control system 34 activates a timer to allow a designated wait period to lapse (e.g., 5 seconds). At block 274, the control system 34 commands the bottom drain valve 30 to be opened to allow the fluid duct 36 to drain. At step 276, the control system 34 activates a timer for providing a wait period to allow the fluid duct 36 to drain. In the FIG. 6 embodiment, the wait timer is set at 5 seconds. (See step 276). At block 278, following the drain period wait time, the control system 34 issues a command to close the bottom drain valve 30. The process continues at block 207 wherein the control system 34 initiates a shutdown engine process and logs an incident report due to the determination of a possible malfunctioning bottom drain valve 30. Thereafter, if the shutdown engine process is initiated, the control system 34 stops the process of the automated water drainage system 22 as indicated at Stop block 210.

Returning to block 268 and the purge liquid drain process, if the pre and post pressure stabilization wait period fluid duct pressures, namely, WFDP and WFDP' are somewhat similar and a difference therebetween is less than a threshold value (e.g., 50 psig), the process continues at step 290. At step 290, the control system 34 issues a command to open the bottom drain valve 30 allowing the purge liquid to drain form the fluid duct 36 to the purge drain 54. Also at step 290 the control system 34 adds the number one to the counter value for keeping track of the number of occurrences of a water in fuel condition. Thereafter, at step 292, the control system 34 activates a timer for allowing the purge liquid to vacate the fluid duct 36. In the illustrated embodiment, the timer is set for twelve seconds. The process continues at step 294 wherein the control system 34 issues a command to close the bottom drain valve 30 following the draining of the purge liquid from the fluid duct 36. At block 296, the control system 34 records data associated with the water in fuel occurrence and associated purge liquid drain process.

Following a successful completion of the purge liquid drain process, the control system compares the count value to a designated maximum count value (e.g., 3) as shown at block 298. If the count value is greater than the designated maximum count value, the control system 34 initiates an engine shut down process at block 207. Thus, if the number of occurrences of a water in fuel condition and associated purge liquid drain process is greater than a predetermined maximum, the control system is configured to shut down the engine so that the cause of the condition can be investigated and/or resolved. In some embodiments a time period may also be utilized as well as the maximum count value wherein the maximum count may be required to occur within a certain period of time (e.g., 90 days) prior to the initiation of an engine shut down process due to repeated occurrences of a water in fuel condition. Once the engine shut down process is initiated at block 207, the control system aborts the process of the automated water drainage system 20 as indicated at Stop block 210.

Returning to block 298, if the count value is less than the designated maximum count value, the control system 34 continues the process of checking for and removing water contaminated fuel from the water-fuel separator 24. At block 300, the output of the water sensor 26 is again checked to determine whether or not there is water contaminated fuel in the water-fuel separator 24. Water is deemed present at the water sensor 26 if the pressure is identified as HIGH or above a designated threshold for a designated period of time (e.g., if the pressure at the water sensor is above a threshold pressure for a duration of 2 minutes). If the output 38 of the water sensor is LOW (e.g., below a threshold pressure, or HIGH for less then a designated time threshold), then a no water or dry fuel condition is identified and the water drainage process 20 returns to the START block 200.

When the output 38 is indicative of water being sensed by the water sensor 26, (i.e., WIFP=HIGH at block 300), the process continues at block 302 wherein the quality of the output of the pressure sensor 32 is checked. If the pressure sensor 32 is deemed to be functioning properly as discussed above, the process continues at process block 230 (also identified by the letter block "E" and reference number 232) wherein the operation of the top drain valve is checked as set forth hereinabove.

Alternatively, if at block 302, the output of the pressure sensor 32 is determined to be outside of a designated operational range or otherwise of unacceptable quality, the control system 34 will continue at process block 310, identified by the letter "C" at block 312 on FIG. 4. The process block 310 is for checking the functionality of the drain pressure sensor 32 and initiating an engine shut down process in the event the drain pressure sensor is identified as inoperative or malfunctioning. The process continues at block 314 wherein the control system 34 activates a timer for allowing the drain pressure sensor and/or any components or inputs associated with the pressure sensor to stabilize. As shown in block 314, in the illustrated embodiment, the timer is a two-minute timer, wherein the control system 34 allows two minutes to lapse prior to rechecking the quality of the output of the drain pressure sensor 32 at block 316. If the pressure sensor 32 is deemed to be functioning properly as discussed above, the process continues at process block 230 also identified by the letter block "E" and reference number 232 of FIG. 5.

Alternatively, if the output 40 of the drain pressure sensor 32 is determined to be outside of an operative range or otherwise of unacceptable quality at decision block 316, the process continues at step 207 where a shut down process for the engine 42 is initiated. Thereafter, at step 210 the control system aborts the process of the automated water drainage system 20 as indicated at Stop block 210.

The various steps and sub-process(es) illustrated by the flow chart shown of FIGS. 4-6 may be carried out in different combinations or in a different order than as specifically shown in FIG. 4. Thus, embodiments of the invention are not limited to a particular order of steps, unless otherwise specified to the contrary.

Regarding system diagnostics, the system 20 exhibits a high level of system safety and no negative environmental impact due to self-diagnostics. For example, using the frequency at which the water sensor 26 outputs a signal indicative of water being sensed in the fuel-water separator 24, the volume V2 between the two drain valves 28, 30, water separator efficiency, and the level of fuel consumption by the engine system 42, it is possible to determine the free water content of the fuel. If the free water content exceeds one or more designated limits and the system fuel tank 44 has recently been filled, the excessive water content can be attributed to the fuel re-fill event and corrective action taken to correct the fuel issue. If free water content exceeds limits and the system fuel tank has not been filled recently, but the engine has been operating, bad engine health can be attributed to the water content issue. If free water content exceeds limits and there has been no fueling or engine health issues, the problem can be attributed to other causes, which may be possible to determine from other engine/vehicle/installation operating parameters.

In one embodiment, the system 20 diagnoses water-contaminated fuel and where and when the fuel contamination occurred, using location data from a GPS unit on the vehicle and fuel tank fill level data. For example, the system may log the location of the vehicle when the fuel tank 44 is filled, using the GPS unit, and then correlate water contamination, detected as described herein, to the location. The system 20 can also diagnose water-contaminated fuel, as relating to engine health and in cases where the contamination is not a fuel source issue, as described above and using other engine parameters in a fault detection algorithm. The may include, but are not limited to, engine coolant water pressure, coolant water level, engine temperature, and engine RPM. The system can also diagnose water-contaminated fuel arising from external events (sabotage, flooding, etc.) based on the wet fuel not resulting from the factors described above and on other locomotive/facility data available via the control system 34. The system 20 may be configured to notify human operators to service the general system(s) 20, 22 or specific components based on the self-diagnostics.

Another embodiment relates to method for automatically removing water from a fuel system. The method comprises monitoring an output 38 of a water sensor 26 in a fuel-water separator 24 for detecting the presence of water. The method further comprises monitoring an output 40 of a drain pressure sensor 32 operably positioned in a fluid duct 36 connecting first and second drain valves 28, 30, for detecting pressure levels in the fluid duct 36. The first drain valve is in fluid communication with the fuel-water separator, the second drain valve is in fluid communication with the first drain valve, and the fluid duct connects the first and second drain valves. The method further comprises automatically operating the first and second drain valves, for removing purge liquid from the fuel-water separator, based on the respective outputs of the water sensor and the drain pressure sensor.

In another embodiment, the method further comprises opening the first drain valve based on the output of the water sensor indicating the presence of water in the fuel-water separator, the second drain valve is in a closed state. It is verified that the first drain valve is open, that the second drain valve is closed, and that the fuel system is pressurized within designated levels based on a pressure detected, by the drain pressure sensor after the first drain valve is opened. After a designated time period for water to separate from fuel in the fuel-water separator and for purge liquid to enter the fluid duct between the first and second drain valves, the first drain valve is closed and the second drain valve is opened for draining the purge liquid from the fluid duct. The method may further comprise verifying that the second drain valve is open and that the purge liquid has drained from the fluid duct, based on a pressure detected by the drain pressure sensor after the first drain valve is closed and the second drain valve is opened.

Another embodiment relates to a method for automatically removing water from a fuel system. The method comprises detecting the presence of water in a fuel-water separator 24. A first drain valve 28 is opened based on the presence of water being detected in the fuel-water separator, with a second drain valve being in a closed state. The first drain valve is in fluid communication with the fuel-water separator, the second drain valve is in fluid communication with the first drain valve, and a fluid duct connects the first and second drain valves. The method further comprises verifying that the first drain valve is open, that the second drain valve is closed, and that the fuel system is pressurized within designated levels, based on a pressure level within the fluid duct that is detected after the first drain valve is opened. After a designated time period for water to separate from fuel in the fuel-water separator and for purge liquid to enter the fluid duct between the first and second drain valves, the first drain valve is closed and the second drain valve is opened for draining the purge liquid from the fluid duct. The method may further comprise verifying that the second drain valve is open and that the purge liquid has drained from the fluid duct, based on a pressure detected by the drain pressure sensor after the first drain valve is closed and the second drain valve is opened.

In another embodiment, the system is configured to vary the operation of the engine system 42 to prevent fuel and/or engine system damage, including possibly shutting down the engine system, if the wet-fuel water ingress exceeds the capability of the automated water drainage system 20.

The system 20 may be configured to determine when the holding tank 54 is full or near full based on the volume of the holding tank, the volume V2 of purge liquid drained each cycle, and the number of drain cycles. Alternatively or in addition, the holding tank 54 may be outfitted with a sensor for detecting the level of purge liquid in the holding tank. In either case, the system 20 may notify an operator if the holding tank is full or near full and should be drain at a designated waste station or otherwise.

In one embodiment, instead of a holding tank 54, water and other purge liquids removed from the fuel-water separator are channeled to a sewage drain system or otherwise out of the vehicle or other powered system. In another embodiment, the water and other liquids removed from the fuel-water separator are channeled to a processing subsystem for treatment. Processed water (with any emulsified fuel removed) is then returned to water/coolant storage in the vehicle or other powered system, is stored otherwise, or is expelled to a sewage drain system or otherwise out of the vehicle or other powered system. In one embodiment, the purge water drain 55 expels water and other liquids removed from the fuel-water separator directly out of the vehicle or other powered system.

Unless otherwise specified, the terms "output," "signal," "signal output," "output signal," etc. of a sensor are used synonymously herein, to refer to an electrical signal that is output by a sensor, where the electrical signal includes information/data about what the sensor is sensing. Sensors may generate a continuous or near-continuous signal output (analog or digital), or periodic signal outputs, or they may be configured to generate output signals when polled or interrogated by the control system 34.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present invention will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality, shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described method and system for automated water drainage in a fuel system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A water drainage system for a fuel system, the water drainage system comprising:
   a fuel-water separator;
   a water sensor operably disposed in the fuel-water separator for detecting the presence of water;
   a first drain valve in fluid communication with the fuel-water separator; a second drain valve in fluid communication with the first drain valve;
   a drain pressure sensor in fluid communication with a fluid duct connecting the first and second drain valves, for determining a pressure within the fluid duct; and
   a control system operably connected to the first and second drain valves, the water sensor, and the drain pressure sensor, wherein the control system controls the operation of the first and second drain valves, for removing purge liquid from the fuel-water separator, based on respective signal outputs of the water sensor and the drain pressure sensor.

2. The drainage system of claim 1 wherein:
   the first drain valve is located at a bottom of the fuel-water separator, below a position of the water sensor; and
   the second drain valve is located below the first drain valve.

3. The drainage system of claim 2 wherein:
   a first volume is defined by the fuel-water separator between the first drain valve and a lateral plane coincident with the position of the water sensor;
   a second volume is defined by the fluid duct between the first drain valve and the second drain valve; and
   the first volume is less than or equal to the second volume, so that when the first drain valve is opened with the second drain valve closed, the second volume accommodates at least as much purge liquid as occupying the first volume in the fuel-water separator.

4. The drainage system of claim 2 wherein:
   the control system opens the first drain valve based on the output of the water sensor indicating the presence of water in the fuel-water separator, with the second drain valve being closed;
   the control system verifies that the first drain valve is open, that the second drain valve is closed, and that the drainage system is pressurized within designated levels based on a pressure detected by the drain pressure sensor after the first drain valve is opened; and
   after a designated time period for water to separate from fuel in the fuel-water separator and for purge liquid to enter the fluid duct between the first and second drain valves, the control system closes the first drain valve and opens the second drain valve for draining purge liquid from the fluid duct.

5. The drainage system of claim 4 wherein the control system verifies that the second drain valve is open and that the purge liquid has drained from the fluid duct based on a pressure detected by the drain pressure sensor after the first drain valve is closed and the second drain valve is opened.

6. The drainage system of claim 4 further comprising a holding tank in fluid communication with the second drain valve for receiving purge liquid drained from the fluid duct.

7. The drainage system of claim 1 wherein:
   the control system opens the first drain valve based on the output of the water sensor indicating the presence of water in the fuel-water separator, with the second drain valve being closed;
   the control system verifies that the first drain valve is open, that the second drain valve is closed, and that the drainage system is pressurized within designated levels based on a pressure detected by the drain pressure sensor after the first drain valve is opened; and,
   after a designated time period for water to separate from fuel in the fuel-water separator and for purge liquid to enter the fluid duct between the first and second drain valves, the control system closes the first drain valve and opens the second drain valve for draining purge liquid from the fluid duct.

8. An automated water drainage system for a fuel system, the water drainage system comprising:
   a fuel-water separator;
   a water sensor operably disposed in the fuel-water separator for detecting the presence of water;
   a first drain valve in fluid communication with the fuel-water separator and located at a bottom of the fuel-water separator, below a position of the water sensor,
   a second drain valve in fluid communication with the first drain valve and located below the first drain valve;
   a drain pressure sensor operably positioned in a fluid duct connecting the first and second drain valves, for detecting pressure levels in the fluid duct; and
   a control system operably connected to the first and second drain valves, the water sensor, and the drain pressure sensor, wherein:

the control system opens the first drain valve based on the output of the water sensor indicating the presence of water in the fuel-water separator, with the second drain valve being closed; the control system verifies that the first drain valve is open, that the second drain valve is closed, and that the drainage system is pressurized within designated levels based on a pressure detected by the drain pressure sensor after the first drain valve is opened; and after a designated time period for water to separate from fuel in the fuel-water separator and for purge liquid to enter the fluid duct between the first and second drain valves, the control system closes the first drain valve and opens the second drain valve for draining the purge liquid from the fluid duct; and a first volume is defined by the fuel-water separator between the first drain valve and a lateral plane coincident with the position of the water sensor; a second volume is defined by the fluid duct between the first drain valve and the second drain valve; and the first volume is less than or equal to the second volume, so that when the first drain valve is opened with the second drain valve closed, the second volume accommodates at least as much purge liquid as occupying the first volume in the fuel-water separator.

9. A method for automatically removing water from a fuel system, the method comprising:

monitoring an output of a water sensor in a fuel-water separator for detecting the presence of water;

monitoring an output of a drain pressure sensor operably positioned in a fluid duct connecting first and second drain valves, for detecting pressure levels in the fluid duct, wherein the first drain valve is in fluid communication with the fuel-water separator, the second drain valve is in fluid communication with the first drain valve, and the fluid duct connects the first and second drain valves; and automatically operating the first and second drain valves, for removing purge liquid from the fuel-water separator, based on the respective outputs of the water sensor and the drain pressure sensor.

10. The method of claim 9 further comprising:

opening the first drain valve based on the output of the water sensor indicating the presence of water in the fuel-water separator, wherein the second drain valve is closed;

verifying that the first drain valve is open, that the second drain valve is closed, and that the fuel system is pressurized within designated levels based on a pressure detected by the drain pressure sensor after the first drain valve is opened; and after a designated time period for water to separate from fuel in the fuel-water separator and for purge liquid to enter the fluid duct between the first and second drain valves, closing the first drain valve and opening the second drain valve for draining the purge liquid from the fluid duct.

11. The method of claim 10 further comprising verifying that the second drain valve is open and that the purge liquid has drained from the fluid duct based on a pressure detected by the drain pressure sensor after the first drain valve is closed and the second drain valve is opened.

12. A method for automatically removing water from a fuel system, the method comprising:

detecting the presence of water in a fuel-water separator;

opening a first drain valve based on the presence of water being detected in the fuel-water separator, with a second drain valve being in a closed state, wherein the first drain valve is in fluid communication with the fuel-water separator, the second drain valve is in fluid communication with the first drain valve, and a fluid duct connects the first and second drain valves;

verifying that the first drain valve is open, that the second drain valve is closed, and that the fuel system is pressurized within designated levels based on a pressure level within the fluid duct that is detected after the first drain valve is opened; and after a designated time period for water to separate from fuel in the fuel-water separator and for purge liquid to enter the fluid duct between the first and second drain valves, closing the first drain valve and opening the second drain valve for draining the purge liquid from the fluid duct.

13. The method of claim 12 further comprising verifying that the second drain valve is open and that the purge liquid has drained from the fluid duct based on a pressure detected by the drain pressure sensor after the first drain valve is closed and the second drain valve is opened.

\* \* \* \* \*

UNITED STATES PATENT AND TRADEMARK OFFICE
CERTIFICATE OF CORRECTION

PATENT NO. : 8,431,028 B2
APPLICATION NO. : 13/499696
DATED : April 30, 2013
INVENTOR(S) : Anderson et al.

It is certified that error appears in the above-identified patent and that said Letters Patent is hereby corrected as shown below:

In the Specification

In Column 5, Line 3, delete "(Step" and insert -- (See step --, therefor.

In Column 6, Line 20, delete "senor" and insert -- sensor --, therefor.

In Column 6, Line 43, delete "then" and insert -- than --, therefor.

In Column 6, Line 49, delete "control," and insert -- control --, therefor.

In Column 7, Line 15, delete "valve-28" and insert -- valve 28 --, therefor.

In Column 8, Line 15, delete "30 psig.)," and insert -- 30 psig), --, therefor.

In Column 8, Line 23, delete "continues," and insert -- continues --, therefor.

In Column 9, Line 18, delete "54." and insert -- 55. --, therefor.

In Column 9, Line 61, delete "then" and insert -- than --, therefor.

In Column 11, Line 1, delete "The may" and insert -- They may --, therefor.

In Column 11, Line 33, delete "detected,by" and insert -- detected by --, therefor.

In Column 13, Line 23, delete "instrumentality," and insert -- instrumentality --, therefor.

In the Claims

In Column 14, Line 45, in Claim 7, delete "and," and insert -- and --, therefor.

In Column 14, Line 59, in Claim 8, delete "'sensor," and insert -- sensor; --, therefor.

Signed and Sealed this
Ninth Day of July, 2013

Teresa Stanek Rea
*Acting Director of the United States Patent and Trademark Office*